Figure 3:
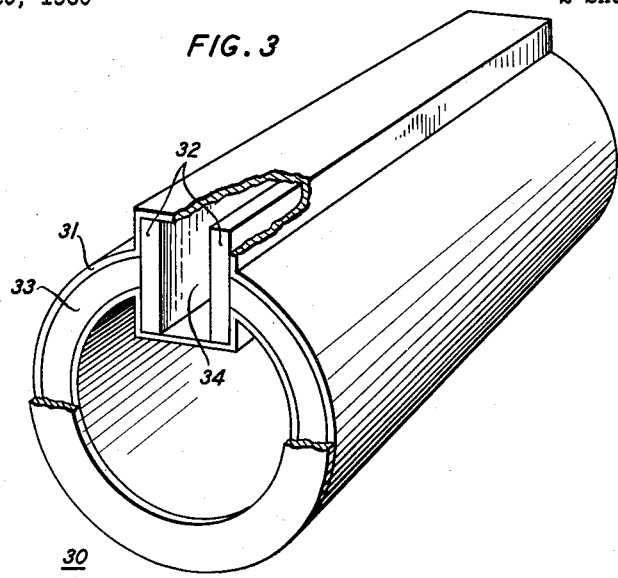

July 16, 1963 P. P. CIOFFI 3,098,181
MAGNETIC CIRCUIT USING SUPERCONDUCTOR PROPERTIES
Filed Aug. 29, 1960 2 Sheets-Sheet 1

INVENTOR
P. P. CIOFFI
BY
ATTORNEY

July 16, 1963  P. P. CIOFFI  3,098,181
MAGNETIC CIRCUIT USING SUPERCONDUCTOR PROPERTIES
Filed Aug. 29, 1960  2 Sheets-Sheet 2

INVENTOR
P. P. CIOFFI
BY
ATTORNEY

United States Patent Office 3,098,181
Patented July 16, 1963

3,098,181
MAGNETIC CIRCUIT USING SUPERCONDUCTOR PROPERTIES
Paul P. Cioffi, Summit, N.J., assignor to Bell Telephone Laboratories, Incorporated, New York, N.Y., a corporation of New York
Filed Aug. 29, 1960, Ser. No. 52,393
8 Claims. (Cl. 317—158)

This invention relates to magnetic circuit arrangements and, more particularly, to the use of the magnetic and electrical properties of superconductors to control the path of magnetic flux in magnetic circuits.

It frequently happens that devices, such as masers, which operate at very low temperature, also require magnetic fields of high intensity and uniformity over an extended region. However, as is well known, the magnetic field between two poles at different magnetic potential is ordinarily characterized by nonuniformity due principally to leakage and fringing of flux near the gap. In the past the required uniformity of magnetic field has been achieved by utilizing a small portion of the field developed over an air gap of much larger cross section. The size of the gap required has necessitated the use of large permanent magnets or large, power consuming electromagnets. The problem of magnet size has been aggravated by the fact that, as the magnets are too large to place inside a low temperature cryostat, the air gap must be at least large enough to contain the cryostat. For instance, a magnet for use with one such device requires 700 pounds of alnico V and an air gap 2.8 inches long to develop a magnetic field of 4,000 oersteds with a uniformity of ±2 oersteds in a volume 5.5 inches by 1 inch by .5 inch. This degree of uniformity requires an air gap cross section of 8 inches by 3 inches. If the magnetic circuit were contained within the cryostat, the length of the air gap could be reduced to 1.2 inches and the cross section of the pole pieces could be reduced proportionately without appreciably affecting the degree of field uniformity. The weight of alnico V required for the magnet would thus be reduced to 48 pounds.

However, there are serious disadvantages to including a magnet of such size and mass within a cryostat. The apparatus becomes large and unwieldy. In addition, greater quantities of refrigerant, typically liquid helium, are required to achieve and maintain the necessary low temperature. An alternative to the permanent alnico V magnet is an electromagnet, but the relatively large amount of power dissipated in ordinary electromagnet coils makes it impractical to include them in the cryostat due to the large quantities of coolant that would be evaporated. Workers in the art have heretofore found these difficulties to be so considerable that they have generally relied upon powerful magnets of sufficient size to develop the necessary flux across an air gap long enough to contain the cryostat within the air gap.

Prior to this invention workers in the art relating to low temperature devices recognized that advantageous use could be made of the phenomenon of superconductivity to achieve an electromagnet of reduced size and enhanced efficiency. It is well known that at very low temperatures below about 15.5° Kelvin, many materials lose all traces of electrical resistivity and become "superconductors." As resistance is the chief cause of power loss in ordinary conductors, it is apparent that superconducting coils will be practically 100 percent efficient. Accordingly, electromagnets utilizing superconducting windings are known in the prior art and are discussed by S. H. Autler in the "Review of Scientific Instruments," vol. 31, No. 4, page 369. A magnet of this type weighing about 27 pounds would be required to replace the 700 pound master magnet referred to above. This reduction in size is due solely to the inclusion of the pole pieces and gap within the cryostat. Further reductions in size cannot be achieved by this technique since the field nonuniformity caused by leakage and fringing remains and must be compensated by the gap cross section.

Accordingly, it is an object of my invention to provide improved magnetic field producing means of a size easily accomodatable within a low temperature cryostat.

Another object of my invention is to provide compact and efficient means for producing an intense and uniform magnetic field over a defined region.

It is also an object of this invention to prevent the loss of flux from magnetic circuits due to leakage and fringing effects.

The invention is based on my recognition of the fact that by placing a magnetic circuit within a low temperature cryostat, advantageous use can be made of the magnetic and electrical properties of superconductors to effect a new and important reduction in the size of the magnet required to produce a magnetic field of a given extent, intensity and uniformity.

According to my invention, I surround the air gap volume between the pole pieces of a magnet with a superconducting material in a magnetic insulating condition, thereby eleminating leakage and fringing of flux between the pole pieces. Losses from such leakage and fringing normally account for a major part of the total flux developed in the circuit. When such losses are eliminated the magnet is required to develop flux only across the useful gap and, therefore, its size and weight may be considerably reduced. Additionally, according to my invention the geometries of the superconducting magnetic insulator and the pole pieces may be chosen so that a uniform magnetic field is achieved in the gap. Furthermore, by interposing a superconducting material between portions of the circuit at different magnetic potentials, I practically eliminate all leakage of flux from the circuit so that the maximum field is developed across the useful air gap. By thus insulating the magnetic circuit my invention enables the 700 pounds of alnico V, heretofore used with a particular maser, to be replaced by a magnet weighing about 6.5 pounds. Such a magnet can easily be placed in the cryostat with the low temperature device. If an electromagnet embodying my invention and having superconducting coils is used instead of the permanent alnico V magnet, the weight required is further reduced to about 5 pounds.

Two characteristics of superconductors are utilized to provide the magnetic insulation by which such results may be achieved. First consider the apparent absence of resistivity. If the phenomenon of superconductivity is interpreted to mean that the conductivity in the superconducting medium becomes infinite then it follows from Ohm's law $$\vec{E} = \frac{1}{\rho}\vec{J}$$

and Maxwell's equation $$\left[\operatorname{curl} \vec{E} = -\frac{1}{c}\frac{\partial \vec{B}}{\partial t}\right]$$

that $\vec{B}$, the magnetic induction, is constant in time inside the medium. Physically, this means that if the superconductor is subjected to a varying external magnetic field currents will be induced at its surface which will act so as to prevent any change in the magnetic induction within. The surface currents distort the external magnetic field so that its flux lines do not penetrate the medium. Due to the infinite conductivity of the superconductor the screening surface currents are not dissipated and the induction within the medium remains unchanged. It follows that if the magnetic induction within a superconducting material is initially zero and the material is then brought into a magnetic field, the magnetic flux cannot penetrate it. In this respect the superconducting material behaves like a perfect "magnetic insulator" and can be utilized to control the path of magnetic flux.

In addition to the infinite conductivity phenomenon, it is also known that when carefully prepared samples of certain substances are cooled in a magnetic field below the temperature at which they become superconducting, known as the transition temperature, the flux lines are "squeezed out" of the medium and the field inside disappears. This is the Meissner effect, from which it appears that a "perfect" superconductor is also a perfect diamagnetic. As flux lines must be continuous, the Meissner effect is accompanied by a corresponding distortion of the external magnetic field. Accordingly, a perfect superconductor exhibiting the Meissner effect can also be used as a "magnetic insulator."

Workers in the art have theorized that all "perfect" superconductors exhibit the Meissner effect, but that the effect is extremely sensitive to inhomogeneities, strains and impurities within the superconducting medium. It has also been theorized that an ordinary superconductor is like a sponge consisting of multiply connected regions or domains of perfect superconductivity enclosing regions of ordinary conductivity. According to this theory, when an ordinary superconductor is cooled in a magnetic field below its transition temperature, the regions of perfect superconductivity exhibit the Meissner effect and the flux is squeezed out of them. Some of the flux is squeezed out of the medium entirely, but some is trapped or "locked in" the regions of ordinary conductivity. To put such a material into a magnetic insulating condition, it is necessary to cool it in a zero or minimal field to a temperature below its transition point, thus avoiding "locked in" flux. "Perfect" superconductors or "Meissner effect materials," on the other hand, become magnetic insulators upon cooling below the transition temperature regardless of the external field or past history of the sample.

In one illustrative embodiment of my invention a permanent magnet having pole pieces separated by a gap is enclosed at room temperature with a material which exhibits the Meissner effect at very low temperatures. When this arrangement is placed in a low temperature cryostat and cooled below the transition point of the Meissner effect material, leakage and fringing of flux around the magnet are eliminated.

In another illustrative embodiment the magnetomotive force in the insulated magnetic circuit is supplied by an electromagnet which is energized after the superconductive magnetic insulator has been cooled below its transition temperature.

A feature of my invention is a magnetic circuit having an air gap which is enclosed within a superconductive magnetic insulator member, whereby leakage and fringing of magnetic flux at the gap is eliminated.

Another feature of my invention is a magnetic circuit having planar pole faces separated by a gap which is enclosed within a superconductive magnetic insulator member, whereby a uniform magnetic field is produced in the gap.

A third feature of my invention is a magnetic circuit arrangement completely enclosed within a superconductive magnetic insulator member, whereby leakage and fringing are eliminated at all parts of the circuit.

Figure 1:
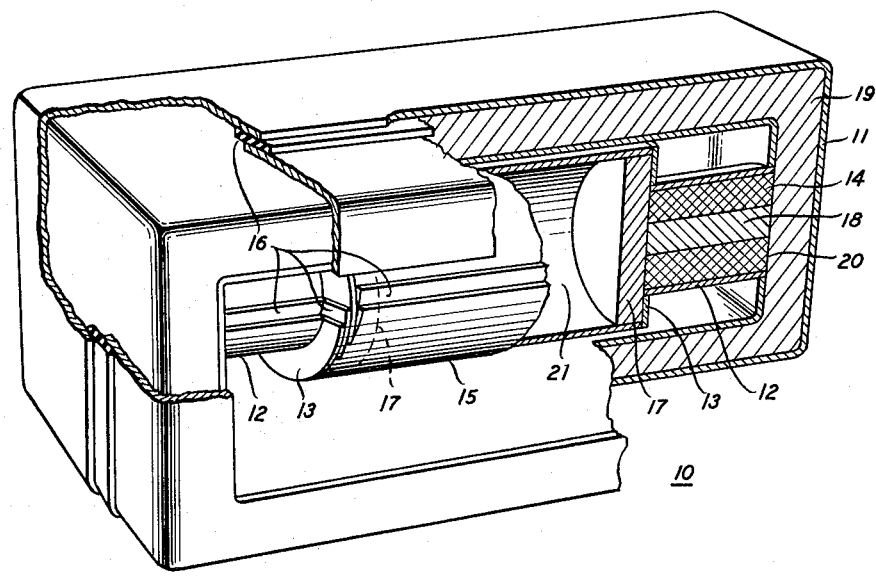

The invention as well as the above-noted and other objects and features will be better understood from the following discussion taken in conjunction with the drawing in which:

FIG. 1 is a cut-away perspective view of a particular embodiment of the invention;

FIGURES 2 (a) and (b) show, respectively, in diagrammatic form the cross-sectional configuration of the magnetic field between the poles of a magnet under ordinary conditions, and in a magnetic circuit arrangement in a low temperature cryostat according to the invention and FIG. 3 is a cut-away perspective view of another embodiment of the invention.

Referring now to the drawings, the magnetic circuit arrangement 10 shown in FIG. 1 comprises an electromagnet having a coil 14 with a permeable core member 18 one end or pole of which is in contact with a pole piece 17. The other end or pole of the member 18 is in contact with a permeable magnetic circuit member 19 which completes a flux path linking the electromagnet shown in the cut-away portion of FIG. 1 in a series magnetic circuit with a similar electromagnet (concealed in the figure by a magnetic insulator member 12) at the opposite end of the member 19. The entire magnetic circuit, formed by the member 19, the two electromagnets and the gap 21 between the pole pieces 17, is shielded by a superconductive magnetic insulator which in accordance with the invention is constructed as follows:

The magnetic circuit member 19 is substantially enclosed by the superconductive magnetic insulator member 11, openings 20 being provided for linking the member 19 with the flux generated by the electromagnets. The coils in the illustrated embodiment are ordinary conductors and are surrounded by coil-sheathing tubular superconductive magnetic insulator members 12 which, however, may be omitted where superconducting windings are used. In that case the windings themselves may be employed as magnetic insulators. Additionally, a magnetic insulator member 13 in the form of an annulus is provided to prevent the leakage of flux from the portion of the pole piece 17 which extends beyond the circumference of the coil 14. A magnetic insulator member 15 encloses the gap 21 between the faces of the pole pieces 17. The superconductive magnetic insulator members 11, 12, 13, and 15, each include an electrical insulator element 16 which is roughly parallel to the flux path enclosed. The elements 16 are included to prevent the flow of induced currents from encircling the flux path. In the absence of such elements it would be necessary to establish the flux in the magnetic circuit before applying the magnetic insulation, otherwise the currents in the superconductor would tend to prevent the formation of any flux at all. In the arrangement 10 depicted in FIG. 1, provision is made for the electrical insulators by overlapping the edges of the superconductive sheet 11 forming the magnetic insulator member. The elements 16 may typically comprise high resistivity or dielectric strips inserted between the overlapped edges. In operation, the entire device 10 would be placed in a cryostat, omitted from the drawing in the interest of clarity and simplicity. Also omitted from the drawings in FIGS. 1 and 3 are the low-temperature device requiring the magnetic field developed by the magnet. Such a device would normally be placed in the gap between the pole faces of the magnet and the entire arrangement, with superconductive magnetic insulator, would be cooled in a cryostat to a temperature below the transition point of the superconductor. For instance, the gap 21 might contain a maser comprising a resonant cavity loaded with a paramagnetic resonant medium and means for coupling wave energy to the cavity.

In a particular device constructed as the embodiment illustrated in FIG. 1, the ratio of the total magnetic flux developed in the circuit to the magnetic flux across the gap was 6.12 without the magnetic insulation. When the magnetic insulation comprising lead-bismuth and having electrical insulator strips of Mylar tape was applied, the ratio was 1.13, indicating that leakage and fringing were substantially eliminated since ideally the ratio would be 1.0.

Figure 2A:
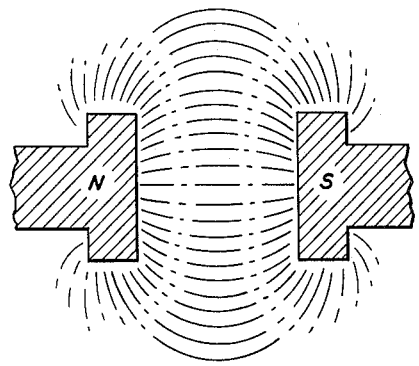
Figure 2B:
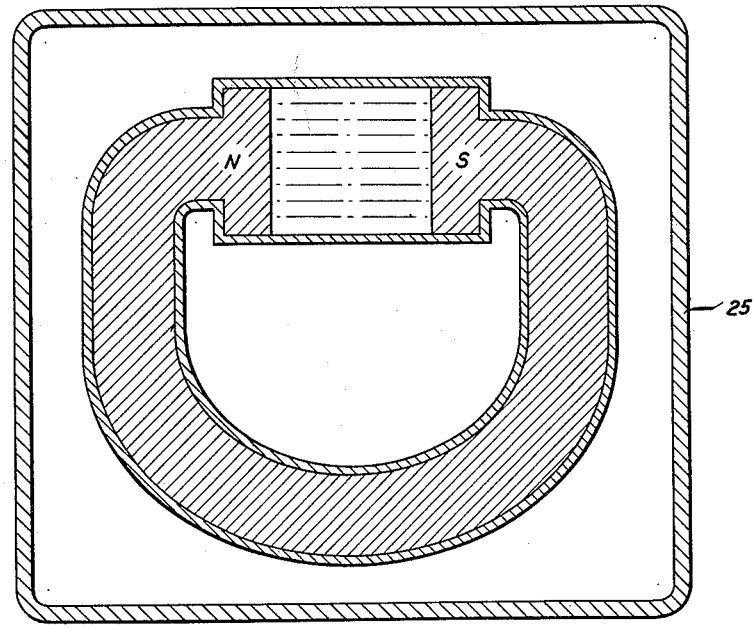

The diagram in FIG. 2(a) shows the magnetic field around the gap between plane parallel pole pieces such as those in the illustrative embodiment of FIG. 1. Under ordinary conditions the lines of flux are bowed outward near the ends of the gap, so that the field is distorted and inhomogeneous everywhere but in the center. When the gap is enclosed within a superconducting magnetic insulator member in accordance with the invention, the flux pattern is uniform as illustrated in FIG. 2(b), where the entire magnetic circuit is contained in the cryostat 25 and maintained at a temperature below the transition temperature of the superconductor.

An alternative embodiment of the invention shown in FIG. 3 comprises a permanent magnet 33 having pole pieces 32. The magnet 33 is covered with a superconductive magnetic insulator member 31 which comprises a material exhibiting the Meissner effect. Additionally, the member 31 encloses the gap 34 between the faces of the pole pieces 32. Electrical insulator elements such as are shown in FIG. 1 are omitted in FIG. 3, being necessary to the invention only when the magnetic flux in the circuit is to be varied after the magnetic insulator has become superconducting. Such elements desirably should be included in case it is desired to adjust the field while the member 31 is below its transition point. Still in accordance with the invention, the Meissner effect material forming the insulator member 31 may be replaced by an ordinary superconductor member having electrical insulating strips as herein disclosed, in which case the permanent magnet 33 should be magnetized after the insulator has been cooled below its transition temperature.

The gap 21 in the arrangement 10 is in the form of a circular cylinder, while the gap 34 in the embodiment 20 is rectangular. However, it is clear that the size and shape of the gap may be varied to accommodate devices of various sizes. In general a uniform magnetic field may be produced by enclosing with magnetic insulator material a cylindrical volume bounded by plane parallel pole faces having different magnetic potentials. Additionally, the shape of the gap shielding magnetic insulator may be modified to produce magnetic fields of various configurations.

Many variations of the illustrative embodiments may be made by those skilled in the art without departing from the principles of the invention.

What is claimed is:

1. Means for preventing the loss of flux from a magnetic circuit comprising a superconductive magnetic insulator member having an internal magnetic induction substantially equal to zero, said superconductive member substantially enclosing the flux path around said magnetic circuit and defining a volume to which the flux in said path is to be confined, and means for maintaining said superconductive member in a superconducting sate.

2. Means for preventing the loss of flux from a magnetic circuit comprising a superconductive magnetic insulator member substantially enclosing the flux path around said magnetic circuit and defining a volume to which the flux in said path is to be confined, said magnetic insulator member having an internal magnetic induction substantially equal to zero and having an electrical insulator element parallel to the flux path in said circuit for interrupting the flow of electrical currents in planes perpendicular to the flux path, and means for maintaining said superconductive member in a superconducting state.

3. A magnetic circuit arrangement comprising first and second magnetic pole pieces having pole faces separated by a gap, magnetomotive means for establishing a magnetic potential difference between said pole faces, a permeable magnetic circuit member forming a flux path between said pole pieces, and a superconductive magnetic insulator member having an internal magnetic induction substantially equal to zero, said insulator member substantially enclosing the flux path formed by said magnetic circuit member, said magnetic insulator member having an electrical insulator element substantially parallel to the flux path in said magnetic circuit member for interrupting the flow of electrical currents and around said flux path.

4. A magnetic circuit arrangement as in claim 3 wherein said magnetic insulator member further substantially encloses the gap between said pole faces.

5. A magnetic circuit arrangement as in claim 3 wherein said magnetomotive means comprises at least one conducting coil around a portion of said magnetic circuit member, said coil being circumferentially enclosed by a superconductive magnetic insulator member characterized by an internal magnetic induction substantially equal to zero and having an electrical insulator element parallel to the axes of said coil to interrupt the flow of electrical currents around the circumference of said coil.

6. A magnetic circuit arrangement as in claim 3 wherein said magnetomotive means comprises at least one superconducting coil around a portion of said magnetic circuit member.

7. Means for producing a uniform magnetic field over a defined region comprising first and second pole pieces having planar pole faces of equal size and similar shape, a hollow cylindrical superconductive magnetic insulating member characterized by an internal magnetic induction substantially equal to zero, said member forming the walls of a cylinder enclosing said region, and bounded by said pole faces, means producing a magnetic potential difference between said pole faces, and means for maintaining said superconductive member in a superconducting state.

8. Means for producing a uniform magnetic field over a region comprising first and second pole pieces having planar pole faces of equal size and similar shape, said pole pieces being positioned with said pole faces in parallel opposition across a gap and defining a cylinder including said region, a superconductive magnetic insulator member characterized by an internal magnetic induction substantially equal to zero and forming the walls of the cylinder defined by said pole faces, said magnetic insulator member including a longitudinal electrical insulator element for interrupting the transverse flow of electrical currents, means for producing a magnetic potential difference between said pole faces, and means for maintaining said superconductive member in a superconducting state.

References Cited in the file of this patent

UNITED STATES PATENTS

| 2,936,408 | Bennetot | May 10, 1960 |
| 2,936,435 | Buck | May 10, 1960 |

OTHER REFERENCES

Autler, Superconducting Electromagnetics, "Review of Scientific Instruments," vol. 31, No. 4, page 369.

Jordan, "Electromagnetic Waves and Radiating Systems," Prentice-Hall, Englewood Cliffs, New York, 1950, pages 132–135 relied on.

Slade et al., A Review of Superconductive Switching Circuits, "National Electronics Conference," vol. XIII, October 7–9, 1957, pages 574–582.

Pippard, Trapped Flux in Superconductors, Philosophical Transactions of the Royal Society, Series A, vol. 248, A. 941, June 23, 1955, pages 97–129.